(No Model.)

J. COUP.
TRUCK.

No. 370,008. Patented Sept. 13, 1887.

Witnesses
Wm. J. Danner
Wm. E. Dyre

Inventor
John Coup
By his Attorneys
Johnston, Reinohl & Dyre

UNITED STATES PATENT OFFICE.

JOHN COUP, OF NEW YORK, N. Y., ASSIGNOR OF ONE-HALF TO JULIUS C. CABLE, OF NEW HAVEN, CONNECTICUT.

TRUCK.

SPECIFICATION forming part of Letters Patent No. 370,008, dated September 13, 1887.

Application filed June 15, 1887. Serial No. 241,401. (No model.)

*To all whom it may concern:*

Be it known that I, JOHN COUP, a citizen of the United States, residing at New York, in the county of New York and State of New York, have invented certain new and useful Improvements in Trucks for Transporting Merchandise; and I do hereby declare the following to be a full, clear, and exact description of the invention, such as will enable others skilled in the art to which it appertains to make and use the same.

My invention relates to trucks for transporting merchandise, and has for its object the construction of a very simple and convenient device, which can be manufactured at a very small cost.

The invention will be hereinafter described, and particularly pointed out in the claims.

Figure 1:
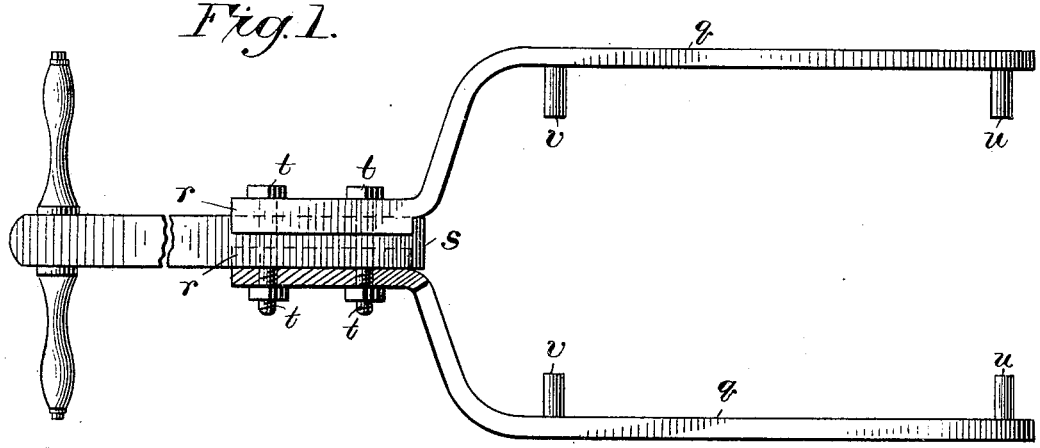
Figure 2:
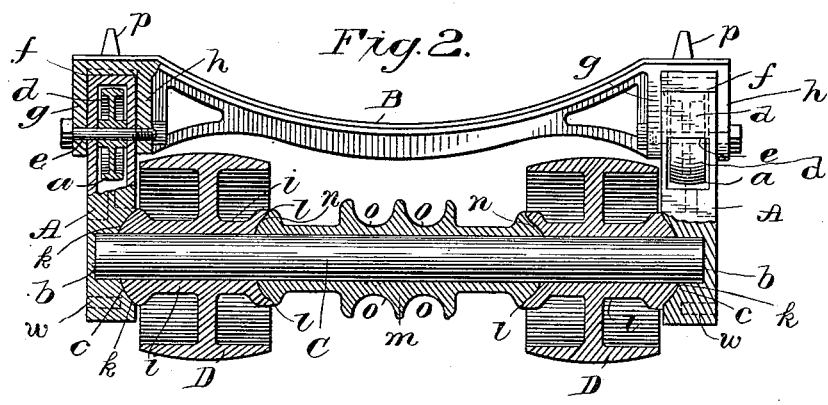
Figure 3:
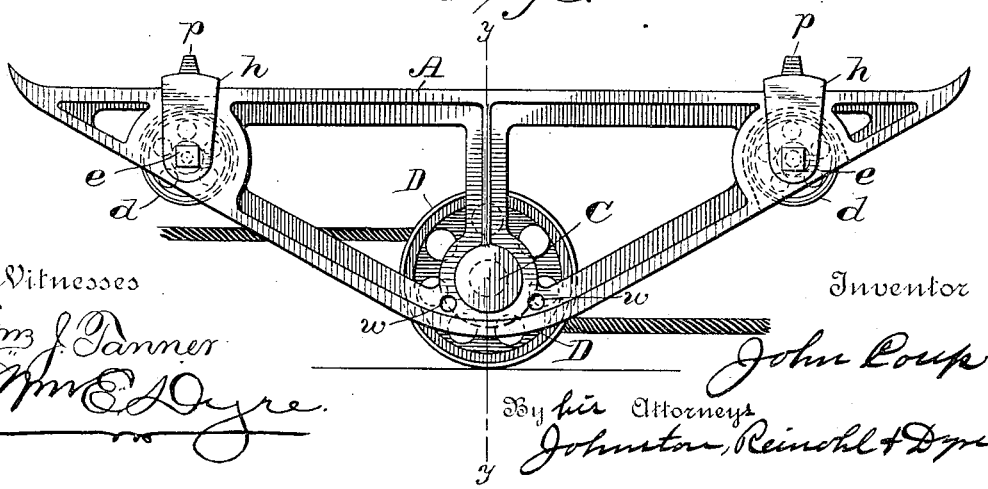

In the accompanying drawings, which form a part of this specification, Figure 1 is a plan of the handle of my improved truck; Fig. 2, a vertical transverse section on the line $y\,y$ of Fig. 3, and Fig. 3 a side view.

Reference being had to the drawings, A A represent the side frames, which are triangular in form, and are made of any suitable cast metal. The frames are provided with pockets $a\,a$ near each end, and in the center of the frame, or near the apex of the triangle, is an aperture or recess, $b$, and a conical seat, $c$. In the pockets $a\,a$ are small wheels $d\,d$, which are held in position by a bolt or axle, $e$.

B B represent the cross-bars, which are provided at each end with a jaw or recess, $f$, formed by lugs $g\,h$, which are integral with the bars and pass down on each side of the frames A, to which they are attached by the bolts $e$, and securely hold the frames against spreading laterally. The upper surface of the cross-bars is concave, to form a seat for a barrel or keg.

C is the axle, upon which is loosely mounted at each end a wheel, D D, having a hub, $i$, one end of which terminates in a conical projection, $k$, which rests in the conical seat $c$ in the frame A, and the opposite end of the hub is provided with a conical seat, $l$. The ends of the axle C rest in the recess $b$, and between the wheels D D upon the axle is mounted a loose sleeve, $m$, which is provided with conical ends $n$, which fit into the corresponding conical seats, $l$, in the hubs $i$ of the wheels D D. By mounting the wheels D D loosely upon the axle C, the truck, with a load on it, can be turned in a very small space, as the wheels will revolve in opposite directions. The sleeve $m$ is enlarged in its center, and provided with grooves $o\,o$ to receive a rope for lowering merchandise down an inclined plane, such as stairways leading from one story of a building to a lower story, or down a gang-plank leading to a vessel.

By the construction of the conical bearings in the frame on the hub of the wheels D D and on the sleeve $m$, dust is excluded, the wear distributed between the frames, the axle, and the sleeve, and no rattling of the parts occurs after they have become worn, as is the case in nearly every other form of truck in use.

Instead of forming the pockets $a\,a$ in the frames A A, the small wheels $d\,d$ may be applied to either side of the frame.

From the upper surface of the bars B B project short conical studs or pins $p\,p$, for engaging with articles placed upon the truck for transportation, and, if desired, a handle, E, detachably secured to the frames A A, may be used.

The handle consists of two metallic arms, $q\,q$, the front ends of which are provided with short horizontal flanges $r\,r$, between which the rear end of the wooden section $s$ is secured by bolts $t\,t$, and the rear ends of the arms $q$ have short inwardly-projecting studs $w\,v$. The former enter recesses in the side of each frame, while the latter engage with the upper surface of the frames to support the weight of the handle.

When it is desired to run the truck under a box, bale, or other article, the truck is elevated at one end, which throws the opposite end down upon one pair of the small wheels $d\,d$, which cause the truck to run under the article easily, instead of being subject to friction from the apex of the triangle to the base, and in traversing an inclined plane in either direction the truck may assume the same position, thus assuring great steadiness to its running.

To facilitate the entering of the truck under articles to be moved, the ends of the frames A are reduced to a point and slightly turned up, as at $q$ $q$.

Having thus fully described my invention, what I claim is—

1. A truck composed of triangular side frames and detachable cross-bars having a jaw or recess at each end adapted to engage with the frames and hold them against lateral displacement, in combination with wheels in the apex and on both sides thereof, substantially as described.

2. A truck having frames provided with a conical seat or bearing and an aperture to receive and support an axle, in combination with wheels having hubs provided with a conical projection adapted to said seat in the frame, substantially as described.

3. A truck having an axle supporting wheels provided with hubs, and a loose sleeve having a groove or grooves formed in it to receive a rope between said wheels, substantially as described.

4. A truck having an axle supported in side frames, wheels mounted upon said axle, and having a conical projection on one end and a conical seat on the opposite end of the hubs, in combination with a sleeve provided with conical projections on its ends, adapted to the seats in the hubs of the wheels, substantially as described.

5. A truck-handle comprising rear metallic sections having horizontal flanges at their front ends and laterally-projecting studs at the rear end, in combination with a wooden front section secured in the recesses formed by said flanges of the rear sections, substantially as described.

In testimony whereof I affix my signature in presence of two witnesses.

JOHN COUP.

Witnesses:
JULIUS C. CABLE,
BENJ. F. JAMES.